(12) United States Patent
Sun

(10) Patent No.: US 8,599,562 B2
(45) Date of Patent: Dec. 3, 2013

(54) FOLDABLE FIXING APPARATUS FOR HARD DISK DRIVE

(75) Inventor: Zheng-Heng Sun, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 176 days.

(21) Appl. No.: 13/207,457

(22) Filed: Aug. 11, 2011

(65) Prior Publication Data

US 2012/0273639 A1 Nov. 1, 2012

(30) Foreign Application Priority Data

Apr. 28, 2011 (CN) .......................... 2011 1 0107301

(51) Int. Cl.
*H05K 7/16* (2006.01)

(52) U.S. Cl.
USPC .......................................... 361/727; 361/725

(58) Field of Classification Search
USPC ............ 312/223.2, 332.1; 361/725, 726, 727, 361/732, 679.4, 679.46–679.54, 688–723; 248/27.1, 27.3, 222.51, 222.52; 16/422, 423, 425, 426
See application file for complete search history.

(56) References Cited

U.S. PATENT DOCUMENTS

| | | | | |
|---|---|---|---|---|
| 3,892,429 A | * | 7/1975 | dit Dalmy | 280/654 |
| 5,951,037 A | * | 9/1999 | Hsieh et al. | 280/655 |
| 7,729,110 B2 | * | 6/2010 | Zhang et al. | 361/679.33 |
| 8,054,638 B2 | * | 11/2011 | Graybill et al. | 361/747 |
| 8,077,467 B2 | * | 12/2011 | Chen et al. | 361/726 |
| 2009/0103252 A1 | * | 4/2009 | Peng et al. | 361/679.4 |

* cited by examiner

*Primary Examiner* — Alfred J Wujciak
(74) *Attorney, Agent, or Firm* — Altis & Wispro Law Group, Inc.

(57) ABSTRACT

A foldable fixing apparatus for fixing a hard disk drive includes a handle and two telescopic arms. The handle includes a sidewall. Each telescopic arm includes a fixing arm and a slide arm. The fixing arms are respectively and rotatably connected to opposite ends of the sidewall. The slide arms are respectively and slidably connected to the fixing arms. When the slide arms are slid towards the handle and telescoped to the corresponding fixing arms, the fixing arms are capable of being rotated to be folded to the handle. When the fixing arms are rotated to be perpendicular to the sidewall of the handle, and the slide arms are slid away from the handle to be extended from the corresponding fixing arms, the hard disk drive is capable of being mounted between the telescopic arms.

12 Claims, 8 Drawing Sheets

FOLDABLE FIXING APPARATUS FOR HARD DISK DRIVE

CROSS-REFERENCE TO RELATED APPLICATION

Relevant subject matter is disclosed in a pending U.S. patent application having a same title, and filed on Aug. 5, 2011, with the application Ser. No. 13/198731, which is assigned to the same assignee as this patent application.

BACKGROUND

1. Technical Field

The present disclosure relates to a foldable apparatus for fixing a hard disk drive.

2. Description of Related Art

Many hard disk drives are fixed to a fixing frame with a number of screws, and then are installed in a bracket of a chassis together with the fixing frame. However, the fixing frame generally occupies large space when packaged or not in use, which is wasteful of storage space.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawing, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
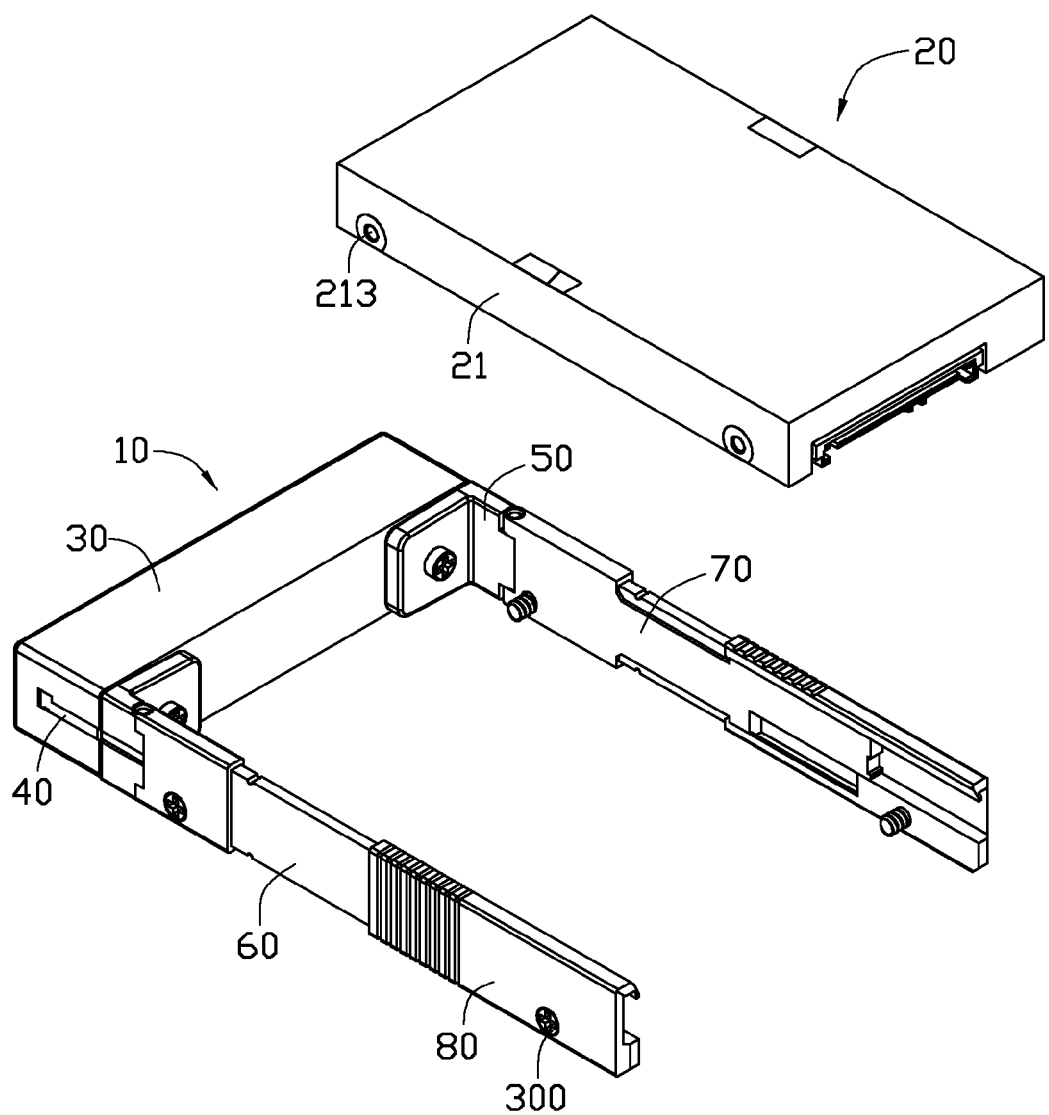
FIG. 1 is an exploded, isometric view of an exemplary embodiment of a foldable fixing apparatus together with a hard disk drive.
Figure 2:
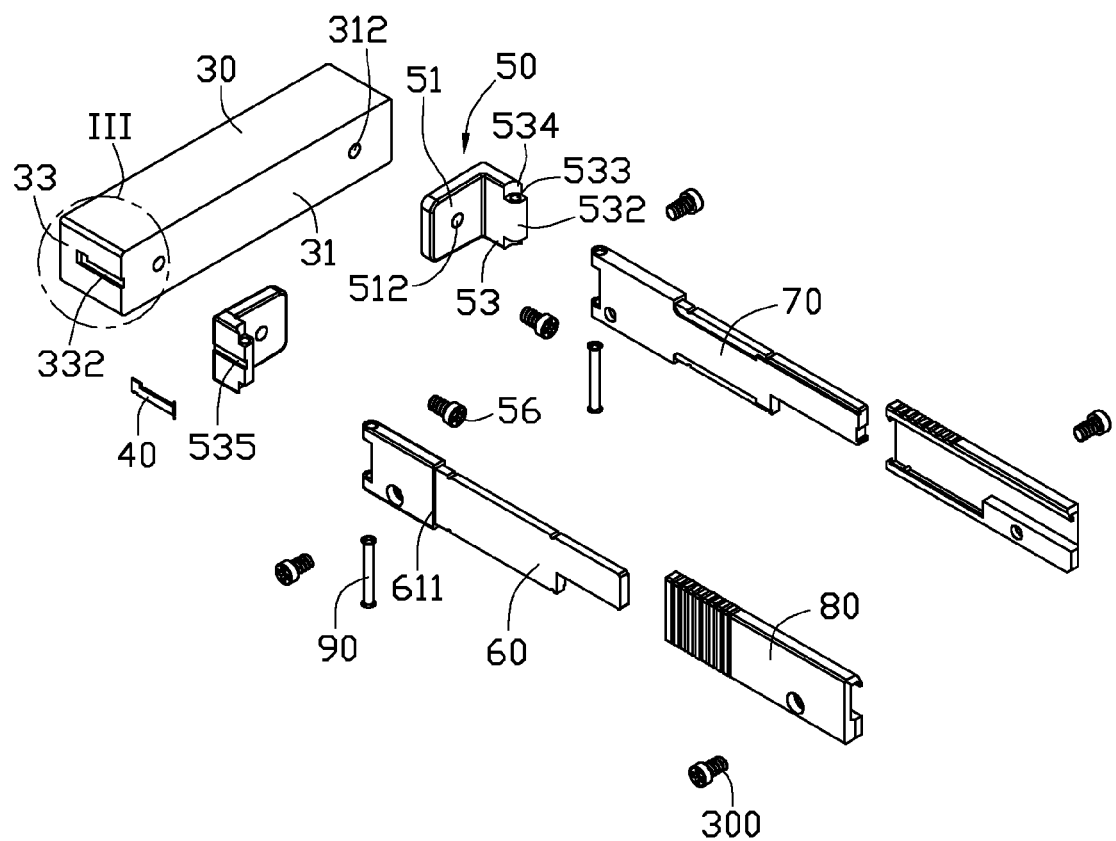
FIG. 2 is an exploded, isometric view of the fixing apparatus of FIG. 1, the fixing apparatus includes a handle, a latch, two fixing members, a first fixing arm, a second fixing arm, and two slide arms.

Referring to FIGS. 1 and 2, an embodiment of a foldable fixing apparatus 10 is provided to fix a hard disk drive 20. The hard disk drive 20 includes two opposite sidewalls 21. Two spaced fixing holes 213 are defined in each sidewall 21. The fixing apparatus 10 includes a handle 30, a latch 40, two fixing members 50, a first telescopic arm, and a second telescopic arm. The first telescopic arm includes a first fixing arm 60 and a slide arm 80. The second telescopic arm includes a second fixing arm 70 and a telescopic arm 80.

Figure 3:
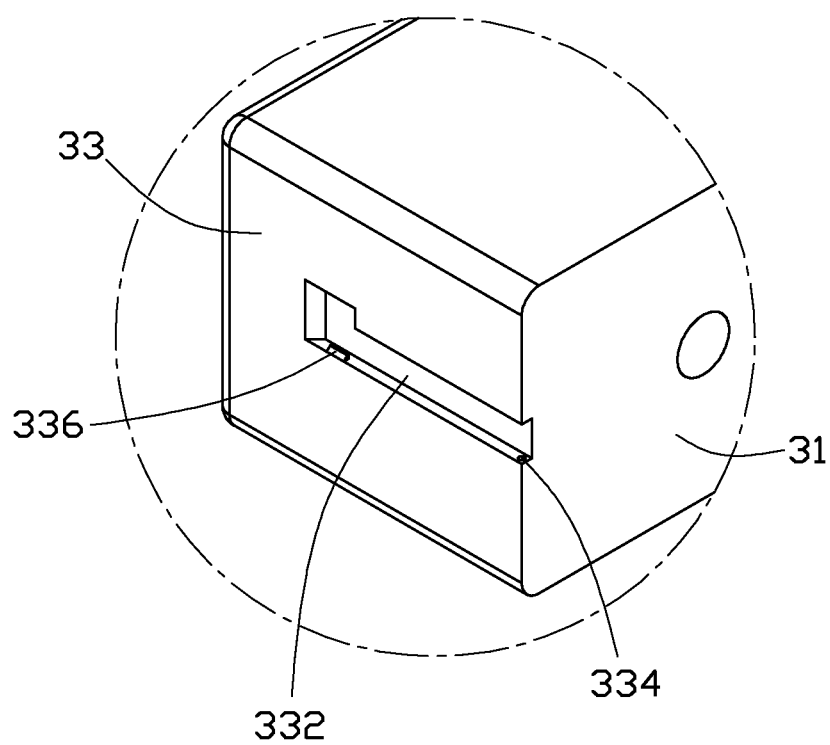
FIG. 3 is an enlarged view of a circled portion III of FIG. 2.

Referring to FIG. 3, the handle 30 includes a sidewall 31, and two end walls 33 perpendicularly extending from opposite ends of the sidewall 31. Two threaded holes 312 are defined in the sidewall 31 respectively adjacent to the end walls 33. A first recess 332 is defined in one of the end walls 33, with an end of the first recess 332 extending through the sidewall 31. Top and bottom walls of the first recess 332 each define a pivot hole 334 adjacent to the sidewall 31. A hooking portion 336 protrudes from the bottom wall of the first recess 332, away from the sidewall 31.

Figure 4:
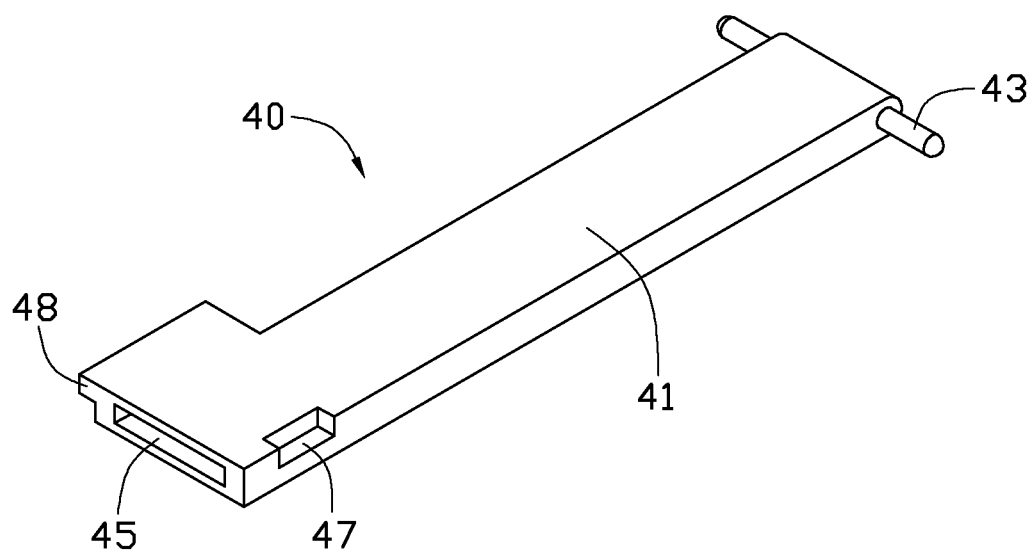
FIG. 4 is an enlarged, another perspective view of the latch of FIG. 3.

Referring to FIG. 4, the latch 40 includes an elongated plate 41. Two pivots 43 protrude from a first end of the plate 41, away from each other. A slot 45 is defined in a second end of the plate 41 opposite to the first end. A hooking slot 47 is defined in a bottom of a side of the plate 41 adjacent to the second end, and a latching portion 48 protrudes from a top of the side of the plate 41 adjacent to the second end.

Referring to FIG. 2, each fixing member 50 is substantially L-shaped, and includes a first fixing portion 51 and a second fixing portion 53 perpendicular to the first fixing portion 51. A through hole 512 is defined in the first fixing portion 51. A pivot portion 532 protrudes from an end of the second fixing portion 53 away from the first fixing portion 51. A through hole 533 is longitudinally defined in the pivot portion 532. Two stop plates 534 are formed on the second fixing portion 53, respectively above and below the pivot portion 532. The stop plates 534 are connected to an outer surface of the second fixing portion 53. A second recess 535 is defined in the outer surface of the second fixing portion 53 of one of the fixing members 50, with two ends of the second recess 535 respectively extending through opposite ends of the second fixing portion 53.

Figure 5:
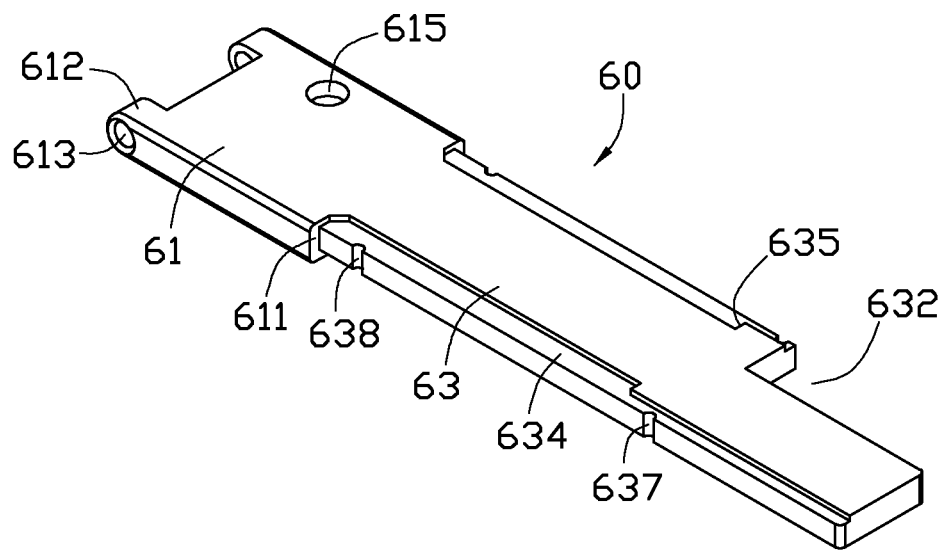
FIG. 5 is an enlarged, another perspective view of the first fixing arm of FIG. 2.

Referring to FIGS. 2 and 5, the first fixing arm 60 includes a mounting portion 61, and an extension arm 63 extending from a first end of the mounting portion 61. A step surface 611 facing a top, an outer surface, and a bottom of the extension arm 63 is formed on the first end of the mounting portion 61. Two paced protrusions 612 extend from a second end of the mounting portion 61 away from the extension arm 63. A pivot hole 613 is defined in each protrusion 612. A through hole 615 is defined in the mounting portion 61, extending through inner and outer surfaces of the mounting portion 61. A notch 632 is defined in a lower portion of an end of the extension arm 63 away from the mounting portion 61. Two substantially L-shaped slide slots 634 are respectively defined in upper and lower portions of the inner surface of the extension arm 63, with opposite ends of each slide slot 634 respectively extending through opposite ends of the extension arm 63. A stop surface 635 facing the mounting portion 61 is formed on each slide slot 634. Two first latching slots 637 are respectively defined in the top and the bottom of the extension arm 63 away from the mounting portion 61. Two second latching slots 638 are respectively defined in the top and the bottom of the extension arm 63 adjacent to the mounting portion 61.

Figure 6:
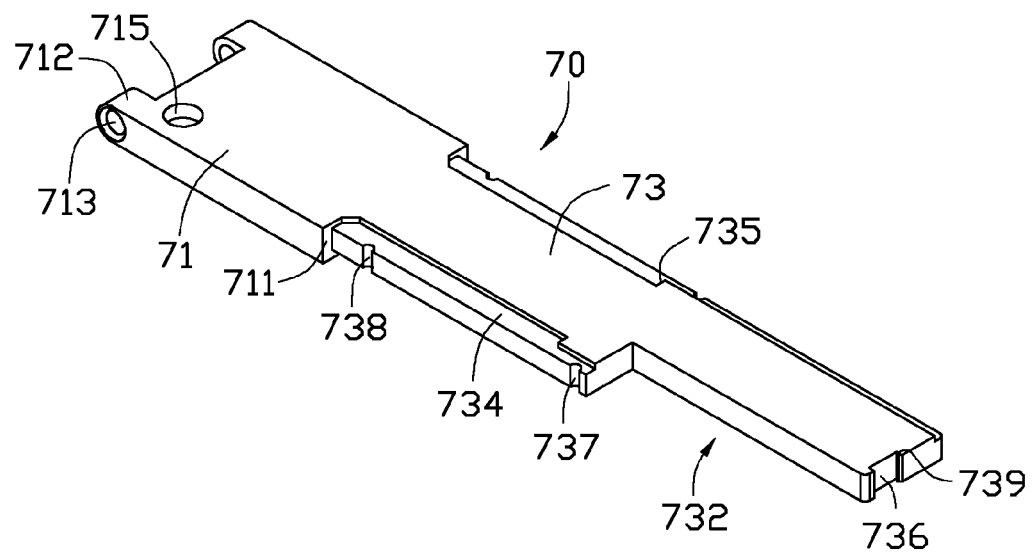
FIG. 6 is an enlarged, another perspective view of the second fixing arm of FIG. 2.

Referring to FIG. 6, the second fixing arm 70 is similar to the first fixing arm 60, and includes a mounting portion 71, and an extension arm 73 extending from a first end of the mounting portion 71. A step surface 711 facing a top, an outer surface, and a bottom of the extension arm 73 is formed on the first end of the mounting portion 71. Two paced protrusions 712 extend from a second end of the mounting portion 71 away from the extension arm 73. A pivot hole 713 is defined in each protrusion 712. A through hole 715 is defined in the mounting portion 71, extending through inner and outer surfaces of the mounting portion 71. A notch 732 is defined in a lower portion of an end of the extension arm 73 away from the mounting portion 71. Two substantially L-shaped slide slots 734 are respectively defined in upper and lower portions of the inner surface of the extension arm 73, with opposite ends of each slide slot 734 respectively extending through opposite ends of the extension arm 73. A stop surface 735 facing the mounting portion 71 is formed on each slide slot 734. Two first latching slots 737 are respectively defined in the top and the bottom of the extension arm 73 away from the mounting portion 71. Two second latching slots 738 are respectively defined in the top and the bottom of the extension arm 73 adjacent to the mounting portion 71. A cutout 736 is defined in a distal end of the extension arm 73 away from the mounting portion 71. Two hooks 739 are respectively formed on top and bottom sides of the cutout 736.

Figure 7:
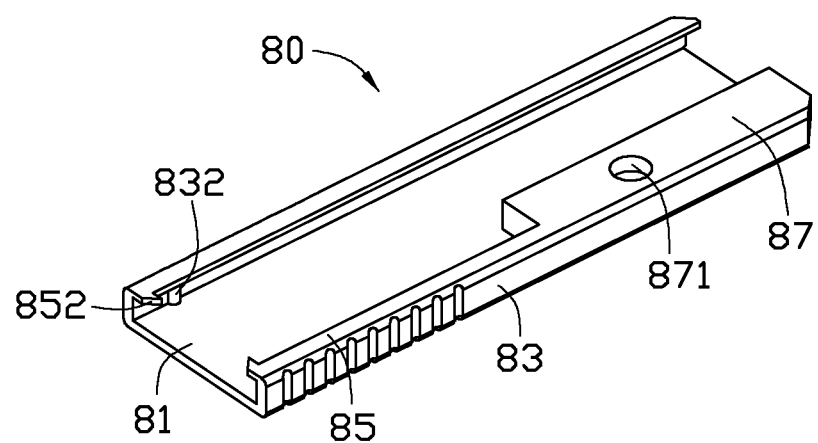
FIG. 7 is an enlarged, another perspective view of one of the slide arms of FIG. 2.

Referring to FIG. 7, each slide arm 80 includes a substantially rectangular plate 81. Two side plates 83 perpendicularly extend inwards from top and bottom sides of the plate 81. Two flanges 85 extend toward each other from distal sides of the side plates 83 away from the plate 81. Two hooks 852 protrude toward each other from first ends of the flanges 85. Two protrusions 832 are respectively formed on inner surfaces of the side plates 83 adjacent to the hooks 852. A block 87 connected to the bottom sidewall 83 is formed on a second end of an inner side of the plate 81 away from the first end. The block 87 defines a through hole 871 extending through the plate 81.

Referring to FIG. 1, to assemble the fixing apparatus 10, the pivots 43 of the latch 40 are inserted into the corresponding pivot holes 334 of the handle 30, to rotatably connect the latch 40 to the first recess 332 of the handle 30. Two screws 56 are respectively extended through the through holes 512 of the fixing members 50, and engage in the corresponding threaded holes 312 of the handle 30, to respectively fix the fixing members 50 to opposite ends of the sidewall 31 of the handle 30. The outer surfaces of the second fixing portions 53 of the fixing members 50 are coplanar with the corresponding end walls 33 of the handle 30, and the second recess 535 of one of the fixing members 50 is in communication with the first recess 332.

The pivot portion 532 of the fixing member 50 having the second recess 535 is inserted into a space between the protrusions 612 of the first fixing arm 60. A pin 90 is extended through the first pivot holes 613 and the through hole 533, to rotatably connect the first fixing arm 60 to the fixing member 50 having the second recess 535. The pivot portion 532 of the other fixing member 50 is inserted into a space between the protrusions 712 of the second fixing arm 70. A pin 90 is extended through the first pivot holes 713 and the through hole 533, to rotatably connect the second fixing arm 70 to the other fixing member 50.

The flanges 85 of the slide arms 80 are respectively aligned with the slide slots 634 and 734 of the first and second fixing arms 60 and 70. The slide arms 80 are respectively slid towards the first and second fixing arms 60 and 70. The hooks 852 of the slide arms 80 respectively abut against portions of the extension arms 63 and 73 bounding the corresponding slide slots 634 and 734. The hooks 852 of each slide arm 80 are deformed away from each other. The slide arms 80 are further slid until the protrusions 832 engage in the corresponding first latching slots 637 and 737, the hooks 852 pass over the corresponding stop surfaces 635 and 735, and then are restored to engage with the corresponding stop surfaces 635 and 735. Thereby, the slide arms 80 are respectively fixed to the first and second fixing arms 60 and 70 in extended states relative to the first and second fixing arms 60 and 70.

To fix the hard disk drive 20 to the fixing apparatus 10, the latch 40 is rotated to the first recess 332 of the handle 30, to allow the hooking portion 336 to engage in the hooking slot 47 of the latch 40. The first and second fixing arms 60 and 70 are respectively rotated to be perpendicular to the sidewall 31 of the handle 30. The stop plates 534 respectively abut against the outer sides of the first and second fixing arms 60 and 70, to prevent the first and second fixing arms 60 and 70 from further rotating outwards. The hard disk drive 20 is placed between the first and second telescopic arms, to allow the fixing holes 213 of the hard disk drive 20 to align with the corresponding through holes 615 and 715 of the first and second fixing arms 60 and 70 and the corresponding through holes 871 of the slide arms 80. Four screws 300 are respectively extended through the through holes 615, 715, and 871 and engage in the corresponding fixing holes 213. Thereby, the hard disk drive 20 is mounted to the fixing apparatus 10.

Figure 8:
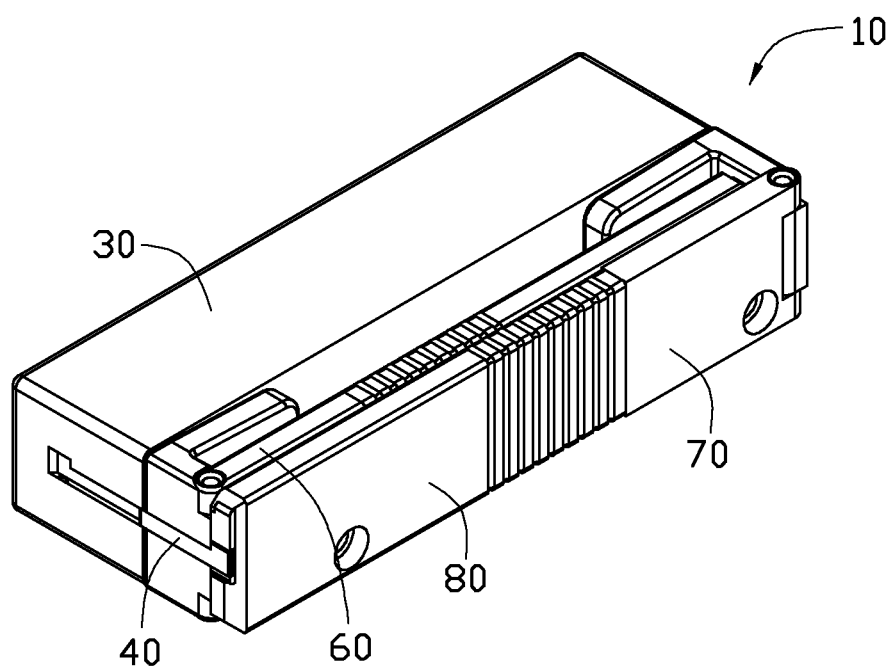
FIG. 8 is an assembled, isometric view of the foldable fixing apparatus, wherein the fixing apparatus is folded.

Referring to FIG. 8, when the fixing apparatus 10 is not in use, the slide arms 80 are slid towards the handle 30, the protrusions 832 are disengaged from the corresponding first latching slots 637 and 737. When the slide arms 80 are slid to abut against the step surfaces 611 and 711 of the corresponding mounting portions 60 and 70, the protrusions 832 engage in the corresponding second latching slots 638 and 738. Thereby, the extension arms 63 and 73 of the first and second fixing arms 60 and 70 are respectively fixedly received in the slide arms 80, the slide arms 80 are telescoped to the corresponding first and second fixing arms 60 and 70. The blocks 87 of the slide arms 80 respectively engage in the notches 632 and 732 of the extension arms 63 and 73. The cutout 736 of the extension arm 73 is exposed out of the second end of the corresponding slide arm 80. The first fixing arm 60 is rotated towards the handle 30, and then the second fixing arm 70 is rotated towards the handle 30, to allow the first and second telescopic arms to be folded to the handle 30. The first telescopic arm is sandwiched between the handle 30 and the second telescopic arm. An operator inserts a finger into the slot 45 and rotates the latch 40 towards the second recess 535 of the corresponding fixing member 50. When the latch 40 is rotated to be received in the second recess 535, the latching portion 48 and the second end of the latch 40 engage in the cutout 736 of the second fixing arm 70 between the hooks 739. Thereby, the second fixing arm 70 is locked to the handle 30 by the latch 40. The fixing apparatus 10 is folded.

In other embodiments, to save money on materials, the fixing members 50 can be omitted. Two pivot portions may directly protrude from opposite ends of the sidewall 31 of the handle 30, and the first and second fixing arms 60 and 70 are respectively rotatably connected to the pivot portions of the handle 30.

Even though numerous characteristics and advantages of the embodiments have been set forth in the foregoing description, together with details of the structure and the functions of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:
1. A foldable fixing apparatus for fixing a hard disk drive, the foldable fixing apparatus comprising:
 a handle comprising a sidewall; and
 two telescopic arms each comprising a fixing arm and a slide arm, wherein the fixing arms are respectively and rotatably connected to opposite ends of the sidewall, and the slide arms are respectively and slidably connected to the fixing arms;

wherein when the slide arms are slid towards the handle and retracted to the corresponding fixing arms, the fixing arms are capable of being rotated to be folded to the handle; when the fixing arms are rotated to be perpendicular to the sidewall of the handle, and the slide arms are slid away from the handle to be extended from the corresponding fixing arms, the hard disk drive is capable of being mounted between the telescopic arms.

2. The foldable fixing apparatus of claim 1, wherein each of the fixing arms comprises a mounting portion, a first end of each mounting portion is rotatably connected to the handle, an extension arm extends from a second end of each mounting portion away from the handle, to be slidably received in the corresponding slide arm.

3. The foldable fixing apparatus of claim 2, wherein two first latching slots are respectively defined in a top and a bottom of each extension arm away from the corresponding mounting portion, two protrusions are respectively formed on a top and a bottom of an inner surface of each slide arm, when the slide arms are extended from the corresponding fixing arms, the protrusions respectively engage in the first latching slots of the fixing arms.

4. The foldable fixing apparatus of claim 3, wherein two second latching slots are respectively defined in the top and the bottom of each extension arm adjacent to the corresponding mounting portion, when the slide arms are telescoped to the corresponding fixing arms, the protrusions respectively engage in the second latching slots of the fixing arms.

5. The foldable fixing apparatus of claim 2, wherein two slide slots are respectively defined in upper and lower portions of an inner surface of each extension arm, each slide arm comprises a plate arranged outside the corresponding extension arm, two side plates respectively extending inwards from top and bottom sides of the plate, and two flanges extending toward each other from the side plates, to slidably engage with the corresponding slide slots.

6. The foldable fixing apparatus of claim 5, wherein each of the slide slots is substantially L-shaped and forms a stop surface facing the corresponding mounting portion, two hooks protrude toward each other from first ends of the flanges of each slide arm adjacent to the corresponding mounting portion, the hooks of each slide arm are slidably received in the corresponding slide slots between the corresponding mounting portion and the corresponding stop surfaces.

7. The foldable fixing apparatus of claim 5, wherein a step surface is formed on the second end of each mounting portion, facing a top, an outer surface, and a bottom of the corresponding extension arm, to engage with the corresponding slide arm when the slide arm is telescoped to the extension arm.

8. The foldable fixing apparatus of claim 5, wherein a first through hole is defined in each mounting portion, and a second through hole is defined in each slide arm, four screws are respectively extended through the first and second through holes of the mounting portions and the slide arms and engage in opposite sides of the hard disk drive.

9. The foldable fixing apparatus of claim 8, wherein a notch is defined in an end of each extension arm away from the corresponding mounting portion, a block protrudes from an inner side of the plate of each slide arm, the second through holes are respectively defined in the blocks through out the corresponding plates.

10. The foldable fixing apparatus of claim 1, further comprising a latch, wherein the handle further comprises an end wall perpendicular to the sidewall, a first end of the latch is pivotably connected to the end wall, when the fixing arms are folded to the handle, one of the fixing arms is sandwiched between the handle and the other fixing arm, the latch is capable of being rotated to lock said other fixing arm.

11. The foldable fixing apparatus of claim 10, wherein a cutout is defined in an end of said other fixing arm away from the handle, two hooks are respectively formed on top and bottom sides of the cutout, and a second end of the latch opposite to the first end is capable of engaging in the cutout between the hooks.

12. The foldable fixing apparatus of claim 10, wherein a recess is defined in the end wall, the latch is received in the recess and pivotably connected to an end of the recess adjacent to the sidewall.

* * * * *